(12) United States Patent
Moder et al.

(10) Patent No.: US 8,978,218 B2
(45) Date of Patent: Mar. 17, 2015

(54) PALLET CHANGING DEVICE FOR A MACHINE TOOL AND MACHINE TOOL COMPRISING A PALLET CHANGING DEVICE

(71) Applicant: DECKEL MAHO Pfronten GmbH, Pfronten (DE)

(72) Inventors: Bernd Moder, Ingenried (DE); Robert Jung, Pfronten (DE)

(73) Assignee: DECKEL MAHO Pfronten GmbH, Pfronten (DE)

( * ) Notice: Subject to any disclaimer, the term of this patent is extended or adjusted under 35 U.S.C. 154(b) by 213 days.

(21) Appl. No.: 13/759,921

(22) Filed: Feb. 5, 2013

(65) Prior Publication Data
US 2013/0202389 A1 Aug. 8, 2013

(30) Foreign Application Priority Data
Feb. 6, 2012 (DE) .......................... 10 2012 201 728

(51) Int. Cl.
| | |
|---|---|
| *B23Q 7/02* | (2006.01) |
| *B23Q 7/04* | (2006.01) |
| *B23Q 7/14* | (2006.01) |
| *B23C 1/14* | (2006.01) |
| *B23Q 1/48* | (2006.01) |
| *B23Q 1/66* | (2006.01) |

(52) U.S. Cl.
CPC ................ *B23Q 7/02* (2013.01); *B23Q 1/4876* (2013.01); *B23Q 1/66* (2013.01); *B23Q 7/1431* (2013.01); *B23Q 7/048* (2013.01)
USPC .......................... 29/33 P; 198/346.1; 409/168

(58) Field of Classification Search
CPC ..................................................... B23Q 7/1431
USPC ........... 409/159, 161, 172, 173, 168; 29/33 P, 29/563; 198/346.1, 345.3; 483/14–15
See application file for complete search history.

(56) References Cited

U.S. PATENT DOCUMENTS

| | | | |
|---|---|---|---|
| 5,531,004 A | 7/1996 | Ahn | |
| 5,992,608 A | 11/1999 | Ahn | |
| 7,627,937 B2 | 12/2009 | Jung | |
| 7,694,799 B2 * | 4/2010 | Bae ........................... | 198/346.1 |

(Continued)

FOREIGN PATENT DOCUMENTS

| | | | |
|---|---|---|---|
| CN | 201565818 U | * | 9/2010 |
| CN | 203141198 U | * | 8/2013 |

(Continued)

OTHER PUBLICATIONS

Machine translation of JP 2004-338054, which JP '054 was published Dec. 2004.*

(Continued)

*Primary Examiner* — Erica E Cadugan
(74) *Attorney, Agent, or Firm* — Christensen O'Connor Johnson Kindness PLLC

(57) ABSTRACT

A pallet changing device (40) for changing pallets on a machine tool comprises a changing device (15) including connecting elements (26, 28) for releasably connecting the pallet changing device (40) to pallets (7, 8), a rotational drive (19) for rotating the changing device (15) in a working plane (18), and a lifting device (20) for raising and lowering the changing device (15) and thus the working plane (18) within a workspace (21). The rotational drive (19) is arranged outside the workspace (21).

21 Claims, 8 Drawing Sheets

(56) References Cited

U.S. PATENT DOCUMENTS

| | | | |
|---|---|---|---|
| 8,714,535 B2 * | 5/2014 | Jung et al. ................. 269/57 |
| 2004/0040413 A1 | 3/2004 | Gunter |
| 2004/0107556 A1 | 6/2004 | Yasuda |
| 2007/0289115 A1 | 12/2007 | Kawai |
| 2009/0110505 A1 | 4/2009 | Jung |
| 2011/0052341 A1 | 3/2011 | Horn |

FOREIGN PATENT DOCUMENTS

| | | | |
|---|---|---|---|
| DE | 35 41 600 A1 | | 5/1987 |
| DE | 19959072 A1 | * | 6/2001 |
| DE | 10 2008 014 781 A1 | | 9/2009 |
| EP | 0 356 216 A2 | | 2/1990 |
| EP | 0 462 533 A2 | | 12/1991 |
| EP | 2 047 946 A1 | | 4/2009 |
| FR | 2916663 A1 | * | 12/2008 |
| JP | 03-221345 A | * | 9/1991 |
| JP | 4-75844 A | | 3/1992 |
| JP | 11-000845 A | * | 1/1999 |
| JP | 2001-009665 A | * | 1/2001 |
| JP | 2004-338054 A | | 12/2004 |
| JP | 2009-297821 A | | 12/2009 |
| WO | 02/45902 A1 | | 6/2002 |
| WO | WO-2008/082237 A1 | * | 7/2008 |

OTHER PUBLICATIONS

Machine translation of CN 203141198-U, which CN '198 was published Aug. 2013.*
German Examination Report dated Dec. 10, 2012, in German Patent Application No. 10 2012 201 728.3 filed Feb. 6, 2012, 19 pages.
European Search Report dated Nov. 6, 2013, in European Patent Application No. 13154236.7, filed Feb. 6, 2013, 11 pages.

* cited by examiner

PALLET CHANGING DEVICE FOR A MACHINE TOOL AND MACHINE TOOL COMPRISING A PALLET CHANGING DEVICE

FIELD

The present application relates to a pallet changing device for a machine tool and to a machine tool comprising a pallet changing device.

BACKGROUND

Program-controlled milling and drilling machines for mass-machining workpieces are often equipped with pallet changers that make possible a rapid exchange of the workpieces and thus increase the cutting performance while reducing down times. The pallets are equipped with workpieces outside the machine tool and releasably fixed on a pallet carrier of a pallet changer. The pallet is positioned above the workpiece table by way of a rotational movement of the pallet changer, and is clamped on this table after a lowering movement. A pallet of the pallet changer is fixed by way of a lifting movement and the resulting engagement of a hook-shaped or claw-shaped pallet carrier in a corresponding recess on the outer edge of the pallet.

FIG. 1 shows an example of the basic construction of a machine tool 1 of this type, such as is known, for example, from EP 2 047 946 B1, which comprises a machine bed 2, on which a pallet changing device 4 is arranged comprising a changing means 15 comprising claws 14 for gripping pallets in the course of the pallet changing process, and comprises a slide 5, which carries a workpiece table 6 comprising a first pallet 7 for clamping a workpiece for processing by a work spindle 9. A pallet carrier 12 is provided for carrying a changing pallet (not shown) comprising a second workpiece which is to be exchanged with the first pallet 7. Guide rails 3 are mounted on the machine bed 2, and the slide 5 is displaceable along the guide rails 3 in the X direction along the machine bed 2. The pallet change device 4 is arranged on an end of the guide rails 3 remote from the spindle 9, and fixed laterally on the machine bed 2 by way of a carrier arm 11. A motor 13 for rotating the changing means 15 through 180.degree. in an X-Y working plane for exchanging the pallets is mounted directly on a carrier plate of the changing means 15.

If the workpiece that is fixed on the changing pallet, instead of the workpiece which is fixed on the first pallet 7, is to be machined by the work spindle 9, the first slide 5 travels along the first guide rails 3 towards the pallet changing device 4 until a changing position is reached, in which the distance and position between the circular table 6 and the pallet carrier 12 are set in such a way that the changing means 15 of the pallet changing device 4 can engage both in the first pallet 7 and in the changing pallet. Subsequently, by raising the changing means 15, rotating the changing means 15 about an axis parallel to the Z direction, and lowering the changing means 15, the first pallet 7 is replaced with the changing pallet. The slide 5 is subsequently displaced along the guide rails 3 towards the spindle 9, together with the changing pallet located on the turntable 6, in such a way that the workpiece that is clamped on the changing pallet can be machined unimpeded.

FIGS. 2 and 3 illustrate in greater detail two stages of the above-described pallet changing process on a machine tool.

FIG. 2 shows a stage in which the claw elements 14 of a changing means 15 engage in receiving elements 16 both of the first pallet 7 and of a second pallet 8 (changing pallet). For this purpose, the circular table 6 and the pallet carrier 12 are located in the changing position, which is to say, at a predefined orientation and distance with respect to one another.

Subsequently, the first pallet 7 is swapped with the second pallet 8 by means of the changing means 15, that is to say, the second pallet 8 is now placed on the circular table 6 instead of the first pallet 7. This is carried out by raising and rotating the changing means 15 about an axis D, which is orientated parallel to the Z direction. Subsequently, the changing means 15 is lowered in the Z direction again, so as to release the operational connection between the claw elements 14 and the corresponding receiving elements 16 of the first pallet 7 and of the second pallet 8. Subsequently, the changing means 15 is again rotated about the axis of rotation D thereof into a home position, so as to reach the stage shown in FIG. 3. Subsequently, the slide 5 can be moved away from the pallet changing device 4 along the guide rails 3, so as to ensure unimpeded machining of the workpiece that is attached to the second pallet 8.

It is to the inventor's credit to have recognised that the dimensions of the changing means 15 in the X-Y plane are relatively large in the machine tool shown in FIGS. 2 and 3. This drawback is in particular due to the fact that an electric drive 13, which is necessary so as to rotate the changing means 15 about the axis of rotation D in the X-Y plane, is integrated into the changing means 15 itself. As a result, in the stage of the pallet changing process shown in FIG. 3 (that is to say, in the changing position), it is only possible to a limited extent to move the circular table 6 as desired with respect to the changing means 15, in particular, to pivot the plane of the workpiece table, this being a basic requirement when a pivoting circular table is used for 5-axis machining. Disadvantageously, before the circular table 6 can be rotated or pivoted, the slide 5 first has to be displaced along the guide rails 3 of the pallet changing device 4 towards the work spindle, together with the workpiece table. However, this takes time and reduces the available workspace of the machine tool.

SUMMARY AND INITIAL DESCRIPTION

Disclosed herein is pallet changing device and a machine tool comprising a pallet changing device with which the above-described problems can be overcome.

In accordance with a first aspect, a pallet changing device for changing pallets on a machine tool comprises a changing means, comprising connecting elements for releasably connecting the pallet changing device to pallets, a rotational drive means for rotating the changing means, comprising, connecting elements in a working plane, and a lifting means for raising and lowering the changing means and thus the working plane within a workspace. The rotational drive means is arranged outside the workspace.

Because the rotational drive means is located outside the workspace, the changing means can be configured more compactly. It is additionally possible to rotate and pivot a workpiece table on which one of the pallets is mounted, without limitations, even if the turntable is located very close to the changing means.

Since the rotational drive means is positioned outside the workspace, it is additionally better protected from dirt and water which accumulates during operation of the machine tool.

A further advantage is that, in this construction, the changing means can be moved independently of a rotating wall which separates the workspace from the preparation space for the pallets, in particular because no cables have to be laid through the rotating wall so as to supply a drive located in the changing means with power.

Preferably, the rotational drive means and the lifting means are fixed outside the workspace and in particular below the workspace. In this context, the term "workspace" refers in particular to the space which is required by the pallet changing device so as to carry out a pallet exchanging process. This comprises the rotational movement in the X-Y working plane and the lifting path of the changing device in the Z direction. In another sense, the entire workspace for the workpiece machining that is required by the machine tool so as to machine the workpiece clamped on the rotating table, that is to say the space for displacing the turntable and the work spindle, may preferably also additionally be included in or covered by the term "workspace."

In a particularly advantageous embodiment, the rotational drive means and the lifting means are positioned in such a way that the changing means can be "retracted" downwards out of the working plane, that is to say at least the main components of the changing means in terms of the constructional size, or even the entire changing means, can be displaced out of the space between the workpiece table and the changing pallet, below the plane which is defined by the lower face of the workpiece table in the normal position horizontally on the machine bed.

In accordance with a further aspect, a pallet changing device for changing pallets on a machine tool comprises a changing means comprising connecting elements for releasably connecting the pallet changing device to pallets, a rotational drive means for rotating the changing means comprising connecting elements, and a lifting means for raising and lowering the changing means. The lifting means is rotationally engaged with the changing means, and the rotational drive means drives the lifting means. In this context, the driving torque from the rotational drive means is transmitted to the changing means via the lifting means.

A particular advantage of this configuration is that, instead of two rotational columns for the lifting and rotational drive means, just one is provided, and this makes the construction of the pallet changing device simpler and more compact. In particular, in connection with the arrangement of the lifting means and the rotational drive means below the workspace, this configuration brings about major constructional advantages: the centre of gravity is displaced downwards, and the pallet changing device can be mounted on the machine bed in a simplified manner, the lifting means and the drive means preferably being arranged below an upper plane of the machine bed, optionally even in part below a lower plane of the machine bed.

In accordance with a particularly advantageous embodiment, a spur gear is attached to the outside of the rotational column, and the rotational drive means comprises a pinion which is engaged with the spur gear. The operational connection is configured in such a way that when the pinion rotates (as a result of an electric motor or a hydraulic system of the rotational drive means), the spur wheel is rotated and thus the rotational column is rotated about the longitudinal axis thereof. In this way, the drive means and lifting means can be combined with one another in a compact and efficient manner.

The rotational drive means may, for example, comprise a servo motor, rendering complex hydraulic drives for rotating the changing means superfluous.

Advantageously, the pinion is continuously in operational connection with the spur gear during the raising and lowering of the rotational column. In this way, it is possible to rotate the changing means while in any intermediate position (and even during the lifting of the rotational column). In this context, the length of the pinion may, for example, be greater than a maximum lifting height of the rotational column.

The lifting means may comprise a pressurising medium cylinder that is below the rotational column and is orientated coaxial with the rotational column. In this way, the terminals of the pressurising medium cylinder (for pressurised fluid, etc.) can be displaced a long way down into the machine bed or below the machine bed, and this makes the connection easier, since there is typically more space available in this region of the machine tool than in an upper region of the machine tool.

The rotational column advantageously comprises an upper portion and a lower portion, the spur gear being fixed to the rotational column in the lower portion, and the diameter of the upper portion of the rotational column being greater than the diameter of the lower portion of the rotational column. In this way, on the one hand, weight can be saved. As a result of the smaller diameter of the lower portion of the rotational column, this portion of the rotational column is lighter per unit length than the upper portion of the rotational column. On the other hand, sufficiently precise guidance of the rotational column can be ensured. The large diameter of the rotational column in the upper region makes precise guidance of the rotational column possible.

Advantageously, the diameter of the upper portion of the rotational column is made smaller than the diameter of the spur gear. A guide structure for guiding the upper portion of the rotational column comprises a stop against which an upper face of the spur gear strikes (or a sliding layer attached thereto strikes, in such a way that the spur gear itself can rotate without difficulty during striking) when the rotational column is located in a maximum lifting position or slightly above the maximum lifting position. In this way, a maximum lifting boundary can be defined mechanically, and, as a result, an electronic control system of the lifting device can be simplified. An appropriate impact sensor may be optionally provided on the stop, and detects the impact. It is additionally ensured that a maximum lifting boundary is not accidentally exceeded. Further, a stop can be provided on which a lower face of the spur gear (or a sliding layer attached thereto) strikes when the rotational column is in a minimum lifting position or slightly below the minimum lifting position. An impact sensor may optionally be provided in this case as well.

In accordance with at least one embodiment described herein, the changing means comprises a longitudinal element that extends within the working plane and which is rotatable within the working plane by rotating the rotational column about the longitudinal axis thereof, a first connecting element being arranged on a first end of the longitudinal element for gripping a first pallet and extending away from the longitudinal element in a first direction within the working plane, and a second connecting element being arranged on a second end of the longitudinal element for gripping a second pallet (changing pallet) and extending away from the longitudinal element in a second direction that is counter to the first direction, within the working plane.

Advantageously, the first connecting element and the second connecting element may each comprise a first portion that extends away from the corresponding end of the longitudinal element in the first direction or second direction, respectively, and each comprise a second portion that is adjacent to the corresponding first portion and extends away therefrom in a direction that extends (at least substantially) parallel to the longitudinal direction of the longitudinal element. The second portion of the first connecting element may be formed so as to engage in the first pallet, and the second portion of the second connecting element may be formed so as to engage in the second pallet. The advantage of a configuration of this type of the changing means is described below in connection with the description of a machine tool.

In one advantageous configuration, the changing means is movable back and forth horizontally about a vertical axis (Z direction) between a changing position in which the longitudinal element takes on a first orientation, the first connecting element can engage in the first pallet, and the second connecting element can engage in the second pallet, and a home position in which the longitudinal element takes on a second position rotated with respect to the first position. In this case, maximum freedom of movement of the circular table is ensured in the home position.

The engagement in the first pallet and in the second pallet (gripping position) and the release of the engagement may, for example, be provided by lifting and lowering the changing means in the Z direction when the changing means is located in the changing position.

In this context, it is particularly advantageous for the changing means to be set up so as to be lowered by the lifting means from the changing position in the Z direction before or after the longitudinal element rotates from the changing position into the home position. In this way, the changing means can be moved out of the working space entirely, in particular out of the space between the pallets.

However, the disclosure herein is not limited to an embodiment of this type, but also includes embodiments in which the changing means is set up so as to be displaced into the home position, which preferably constitutes a position with rotation through 90° in the X-Y plane, in any desired intermediate position in terms of the Z direction (that is to say no maximum lowering of the changing means in the Z direction) after the pallets are released.

Also disclosed herein is a machine tool comprising a workpiece table that carries a first pallet, and a pallet changing device that comprises a pallet carrier for receiving a changing pallet. The pallet changing device is set up so as to exchange this changing pallet for the first pallet on the workpiece table. In this context, the workpiece table is displaceable on guide rails that are arranged on a machine bed. The rotational drive means and the lifting means may be arranged below the upper plane of the machine bed or be mounted laterally on the machine bed. In this context, the housing of the pallet changer, in which housing the rotational drive means and the lifting means are integrated, may be connected into a receiving profile at the front end of the machine bed or be fixed laterally on the machine bed.

In a special configuration of the machine tool, the workpiece table is formed as a pivoting circular table, the work surface of which can be pivoted along an axis of rotation orientated in the Y direction for 5-axial machining of the tool that is clamped on the work surface of the workpiece table. In this context, the pivoting circular table and the pallet carrier can be displaced with respect to one another in such a way that the distance between the pivoting circular table and the pallet carrier is adjusted such that the changing means can reach into the first pallet and into the second pallet in the changing position (engagement position). In this context, the changing means, the pivoting circular table and the pallets are dimensioned and positioned with respect to one another in the changing position in such a way that the first pallet and/or the changing pallet can be rotated and/or pivoted without colliding with the changing means if it is in the above-described home position.

For example, in the changing position, the pivoting circular table and the pallets are positioned with respect to one another in such a way that the centre of the first pallet and the centre of the second pallet are each positioned equidistant from an axis which intersects the axis of rotation of the rotational column and which extends parallel to a displacement direction of the workpiece table. This makes it possible to provide the pallet carrier on the edge of the machine tool, maximising the available workspace for the pivoting circular table and simplifying access to the pallet carrier for a person.

In a case of this type, the above-described configuration of the changing means is particularly advantageous, since in spite of respective offsetting of the first pallet and the second pallet with respect to the axis of rotation of the rotational column, the second portions of the connecting elements each always engage in the first/second pallet parallel to the displacement direction of the workpiece table, and this is particularly expedient for reasons of statics, in particular, if a corresponding engagement mechanism in the first/second pallet, in which the second portions of the connecting elements engage, is arranged centrally on the edge of the pallet with respect to the centre of the pallet.

The longitudinal element can be configured in such a way that, when the pivoting circular table pivots in the home position of the longitudinal element, a minimum distance between the lower face of the pivoting turntable and a region of the longitudinal element which is positioned between the first connecting element and the second connecting element is smaller than a distance between a first end and a second end of the first portion of the first connecting element or is smaller than a distance between a first end and a second end of the first portion of the second connecting element. In other words, the lower face of the pivoting turntable may end up lower in one region, which opposes a region of the longitudinal element between the first connecting element and the second connecting element when the pivoting turntable pivots, than in other regions of the lower face of the pivoting turntable, since there is more space available for pivoting in this region than in the region of the changing means, in which the first connecting element or the second connecting element protrudes from the longitudinal element towards the pivoting turntable.

The profile of the changing means may be configured in such a way that, during pivoting of the pivoting circular table, at least part of the lateral profile of the changing means substantially corresponds to a profile of the lower face of the pivoting turntable when the longitudinal element is in the home position and when the distance between the lower face of the pivoting circular table and the longitudinal element in a region of the longitudinal element between the first connecting element and the second connecting element is at a minimum. In other words, the lower face of the pivoting circular table is adapted appropriately to the lateral profile of the changing means, in such a way that, during pivoting of the pivoting circular table, the space between the pivoting circular table and the changing means is optimally made use of (filled by the pivoting circular table).

The lifting means may comprise a guide structure which guides the rotational column in a region directly below the changing means, the guide structure being bevelled or comprising a recess on a side facing the pivoting circular table, in such a way that the guide structure, starting from an end facing the changing means, widens downwards towards the pivoting circular table, the pivoting turntable being able to move through the bevelled region or the recess during pivoting. In this way, additional space for pivoting can be made available to the pivoting circular table, without significantly detracting from the quality of the guidance of the rotational column by the guide structure, since no bevellings/recesses are provided on any of the other sides, and this is sufficient for a high-quality guidance.

The advantages mentioned in the above-described embodiments, of the cooperation between the pivoting circular table and the changing means (e.g., no collision between the pivoting circular table and the changing means, in spite of the pivoting circular table pivoting in the home position of the changing means) apply analogously to a cooperation between the pallet carrier and the changing means, in so far as the pallet carrier is made pivotable about a Y direction, and this may, for example, be advantageous so as to be able to equip the pallet carrier with a workpiece more easily.

DESCRIPTION OF THE DRAWINGS

Further advantages of the invention are explained in greater detail in the following description using the example of preferred embodiments, with reference to the drawings, in which.

DETAILED DESCRIPTION

Figure 1:
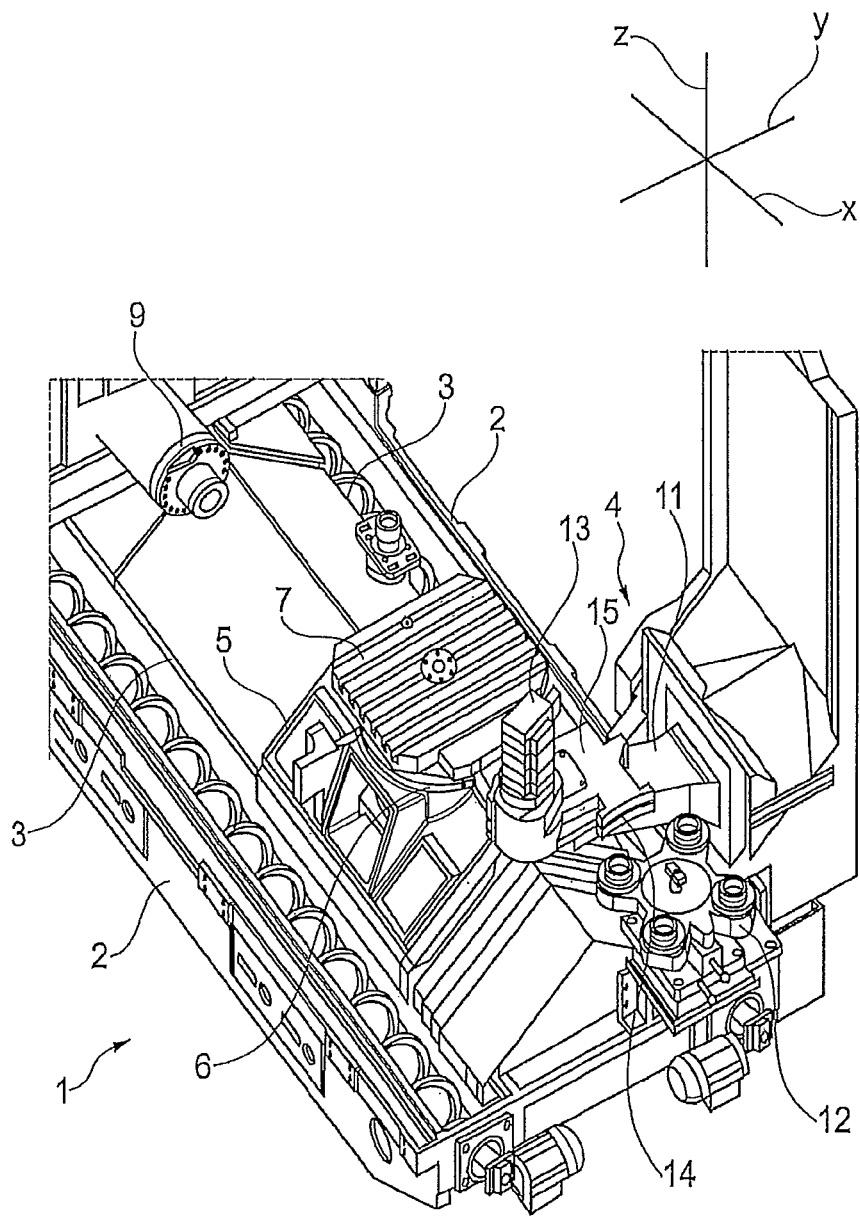
FIG. 1 is a schematic perspective drawing of a conventional machine tool comprising a pallet changing device.
Figure 2:
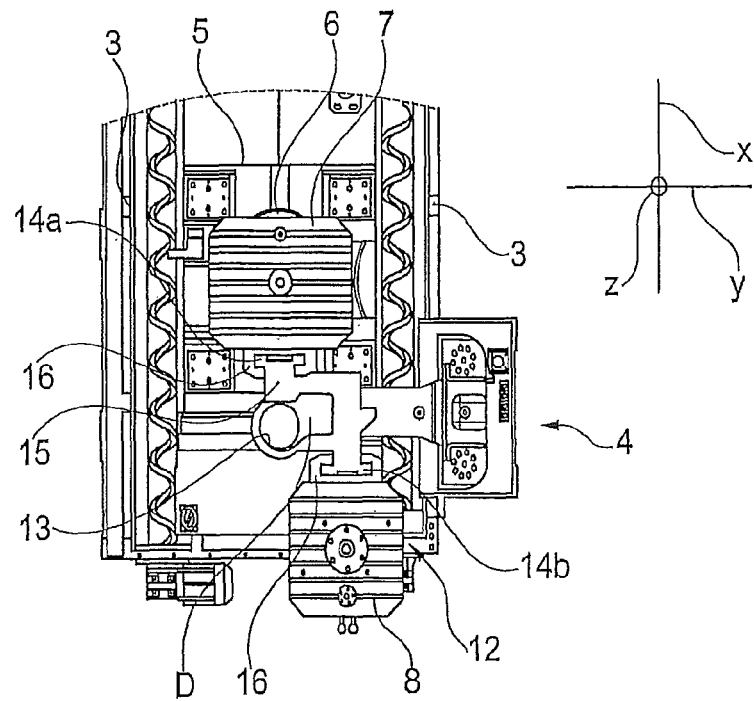
FIG. 2 is a schematic drawing of a first stage of a pallet exchanging process on a conventional machine tool.
Figure 3:
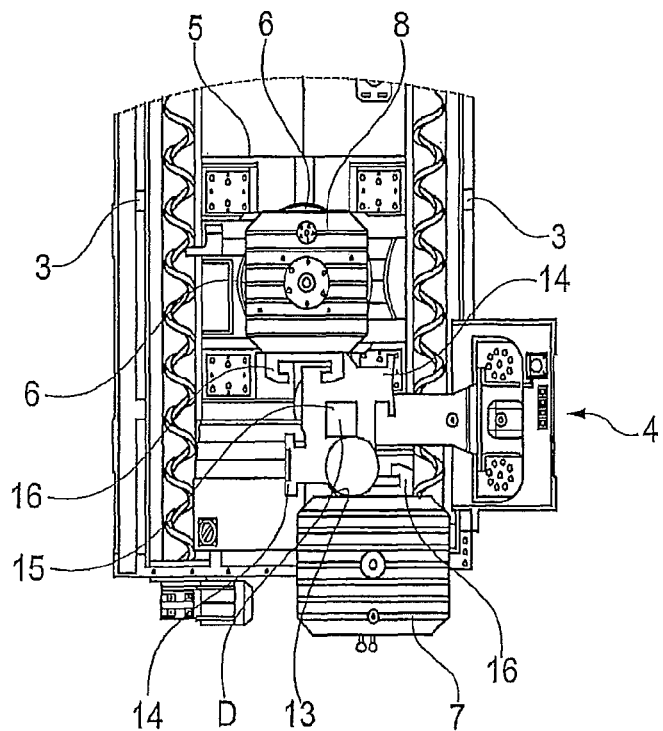
FIG. 3 is a schematic drawing of a second stage of a pallet exchanging process on a conventional machine tool.

In the drawings, identical or mutually corresponding regions, components or component groupings are denoted by like reference numerals.

Figure 4:
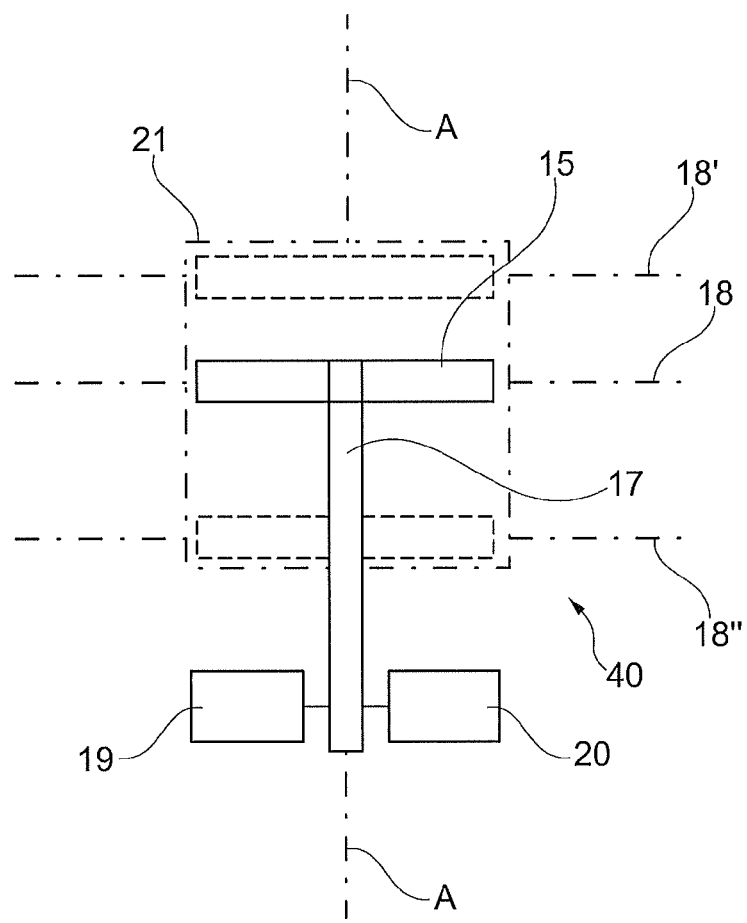
FIG. 4 is a schematic cross-sectional drawing of a pallet changing device in accordance with an embodiment of the present disclosure.

FIG. 4 is a schematic cross-sectional drawing of a pallet changing device 40 in accordance with an embodiment of the present disclosure. The pallet changing device 40 comprises: a changing means 15 for releasably connecting the pallet changing device 40 to pallets; a rotational column 17 that is connected to the changing means 15, the changing means 15 being rotatable within a working plane 18 by rotating the rotational column 17 about the longitudinal axis A thereof; a rotational drive means 19 that is in an operational connection with the rotational column 17 and by means of which the rotational column 17 is rotatable about the longitudinal axis A thereof; and a lifting means 20 for raising and lowering the rotational column 17, so as to raise and lower the changing means 15 and thus the working plane 18 within a workspace 21. The rotational drive means 19 and the lifting means 20 are located outside the workspace 21.

Because the rotational drive means 19 and the lifting means 20 are located outside the workspace 21, the changing means can be made compact, and this in turn means that it is possible to move a circular table of the machine tool, on which the pallet comprising the workpiece to be machined is placed, without limitation, in particular to rotate and pivot it, without it colliding with the changing means 15 in the process, even if the circular table itself is located very close to the changing means 15, as is the case, for example, in the changing position, in which the pallet located on the circular table is replaced with another pallet located on a pallet carrier.

Preferably, the rotational drive means 19 and the lifting means 20 are located below the workspace 21. Alternatively, it is possible to arrange the rotational drive means 19 and the lifting means 20 laterally or above the workspace 21. In this context, the workspace refers, in particular, to the space that is required by the pallet changing device 40 so as to carry out a pallet changing process.

It can be seen from FIG. 4 that the working plane 18 of the changing means 15 is moved up (18') and down (18") when the rotational column 17 is moved up or down by the lifting means. In this context, the position 18' corresponds to raising the pallets (changing means 15 engaged with pallets 7, 8; pallets 7, 8 not engaged with pivoting turntable 6 and pallet carrier 12), the position 18 corresponds to lowering the pallets (changing means 15 engaged with pallets 7, 8; pallets 7, 8 engaged with pivoting turntable 6 and pallet carrier 12), and the position 18" corresponds to the retraction out of the space between the pallets (changing means 15 not engaged with pallets 7, 8; pallets 7, 8 engaged with pivoting turntable 6 and pallet carrier 12). In the present embodiment, the lifting means 20 is a hydraulic control member and the rotational drive means 19 is in the form of a servo motor. However, the rotational drive means 19 and the lifting means 20 may also each be configured as an electric or hydraulic unit.

Figure 5:
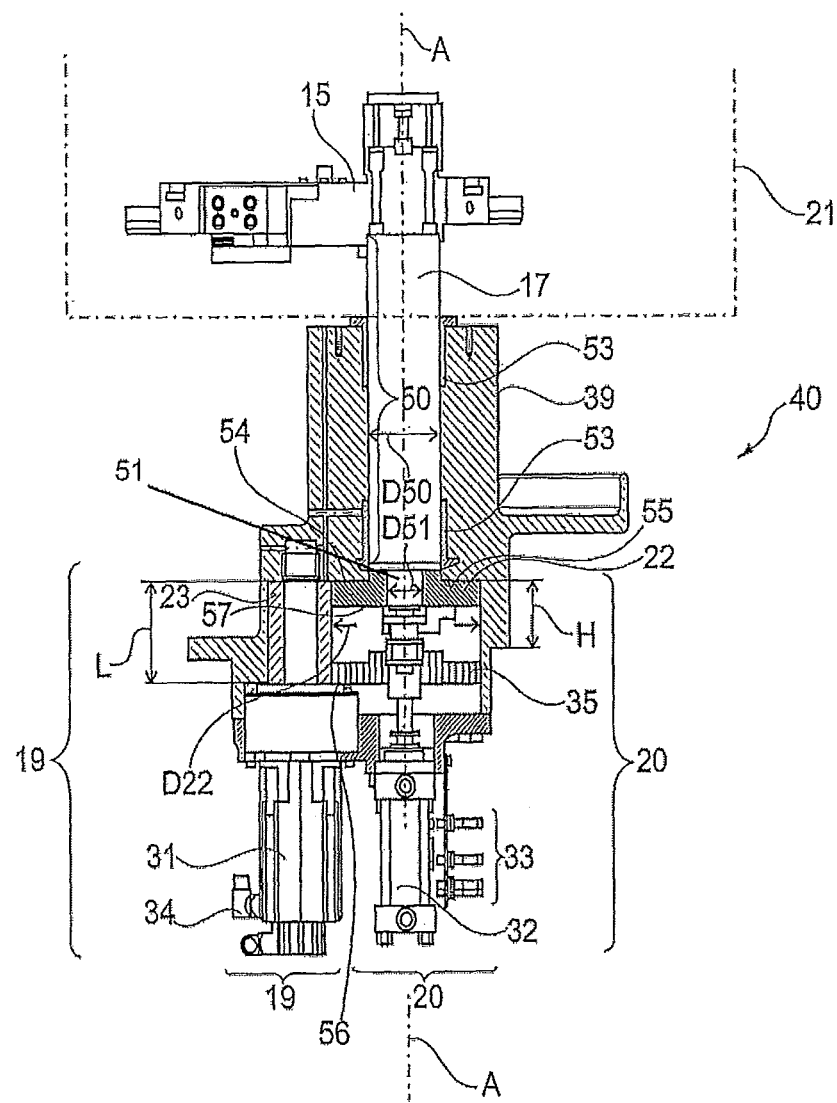
FIG. 5 is a schematic cross-sectional drawing of a pallet changing device in accordance with an embodiment of the present disclosure.

As can be seen from the embodiment of FIG. 5, a spur gear 22 may be attached to the outside of the rotational column 17, and the rotational drive means 19 may comprise a pinion 23 that is engaged with the spur gear 22. When the pinion 23 is rotated by rotational drive motor 31, the spur gear 22 and thus the rotational column 17 are rotated about the longitudinal axis A thereof. In this way, the rotational drive means 19 and the lifting means 20 can be combined with one another in a compact manner without being susceptible to faults. In this embodiment, the pinion is driven by a servo motor 31 that is located below the pinion 23, and supplied with electrical power via a terminal 34. Because of the servo motor 31, the home position can be selected as desired, and this constitutes a major advantage over a hydraulic drive.

The lifting means 20 comprises a lifting cylinder 32 that is arranged below and coaxial with the rotational column 17 and raises and lowers it. For this purpose, the lifting cylinder 32 is supplied with compressed fluid via corresponding fluid lines 33. In this way, the fluid lines 33 of the lifting cylinder 32 (for compressed fluid, etc.) can be displaced a long way down into the machine bed or below the machine bed 2, and this makes it easier to connect the fluid lines 33, since there is typically more space available for this purpose in this region of the machine tool 10 than in an upper region of the machine tool 10.

In the embodiment shown in FIG. 5, the length L of the pinion 23 is greater than the maximum lifting height H of the rotational column 17. In this way, the pinion 23 is in operational connection with the spur gear 22 in an uninterrupted manner during the raising and lowering of the rotational column 17. In the stage shown in FIG. 5, the spur gear 22 is in operational connection with the uppermost part of the pinion 23 (this position can be made use of so as to allow the changing means 15 to engage in the pallets 7, 8). If the rotational column 17 were maximally lowered from this stage, the spur gear 22 would be in an operational connection with the lowest part of the pinion 23, as is indicated by reference numeral 35 (this position can be made use of in such a way that the changing means 15 releases the pallets 7, 8 and so as to rotate the changing means 15 between the gripping position and the home position). It is thus possible to rotate the rotational column 17 about the longitudinal axis A thereof in any raising or lowering stage, and this makes very flexible working of the changing device 15 possible, even with different pallet sizes.

Alternatively, the rotational drive means 19 may be coupled to the lifting means 20 in such a way that it moves up and down together with the rotational column 17. In this case, the length of the pinion 23 may end up being smaller. In this embodiment, the rotational drive means 19 and the lifting means 20 are located below a machine bed on which the pallet changing device is mounted.

The rotational column 17 advantageously comprises an upper portion 50 and a lower portion 51, the spur gear 22 being fixed to the rotational column 17 in the lower portion 51 and a diameter of the upper portion D50 of the rotational column 17 being greater than a (non-constant) diameter D51 of the lower portion 51 of the rotational column 17. In this way, on the one hand, weight can be saved (because of the smaller diameter D51 of the lower portion 51 of the rotational column 17, this portion of the rotational column 17 is lighter per unit length than the upper portion D50 of the rotational column 17), and on the other hand sufficiently precise guidance of the rotational column 17 is ensured (the large diameter D50 of the rotational column 17 in the upper region 50 makes precise guidance of the rotational column 17 possible in the Z direction with little play in the X-Y direction (high mechanical rigidity of the upper region 50 of the rotational column 17)).

Advantageously, the diameter D50 of the upper portion 50 of the rotational column 17 is made smaller than the diameter D22 of the spur gear 22, and a guide structure 53 for guiding the upper portion 50 of the rotational column 17 comprising a stop 54 against which an upper face 55 of the spur gear 22 strikes (or a sliding layer attached thereto strikes, in such a way that the spur gear 22 itself can rotate without difficulty during striking) when the rotational column 17 is located in a maximum lifting position or slightly above the maximum lifting position. In this way, a maximum lifting boundary can be defined mechanically, and as a result an electronic control system of the lifting device 20 can be simplified. An appropriate impact sensor (not shown) may be provided on the stop 54, and detects the impact of the spur gear 22. It is additionally ensured that a maximum lifting boundary is not accidentally exceeded. Further, a stop 56 can be provided on which a lower face 57 of the spur gear 22 (or a sliding layer attached thereto) strikes when the rotational column 17 is located in a minimum lifting position or slightly below the minimum lifting position. An impact sensor may be provided in this case as well.

FIGS. 6 to 9 show, by way of example, how the pallet changing device 40 shown in FIGS. 4 and 5 can be integrated into a machine tool. The machine tool 10 shown in FIGS. 6 to 9 comprises: a pallet changing device 40 in accordance with an embodiment; a pivoting circular table 6 for receiving a first pallet 7; a pallet carrier 12 for receiving a second pallet 8 (changing pallet); and guide rails 3 along which the pivoting circular table 6 and the pallet carrier 12 are displaceable with respect to one another. The pivotable circular table 6 and the pallet carrier 12 are, in particular, displaceable into a changing position (illustrated in FIGS. 6, 7, 8, and 9) in which the distance between the pivoting circular table 6 and the pallet carrier is set in such a way that, in the gripping position (see FIGS. 6, 7, and 8), the changing means 15 can engage in the first pallet 7 and in the second pallet 8.

Figure 6:
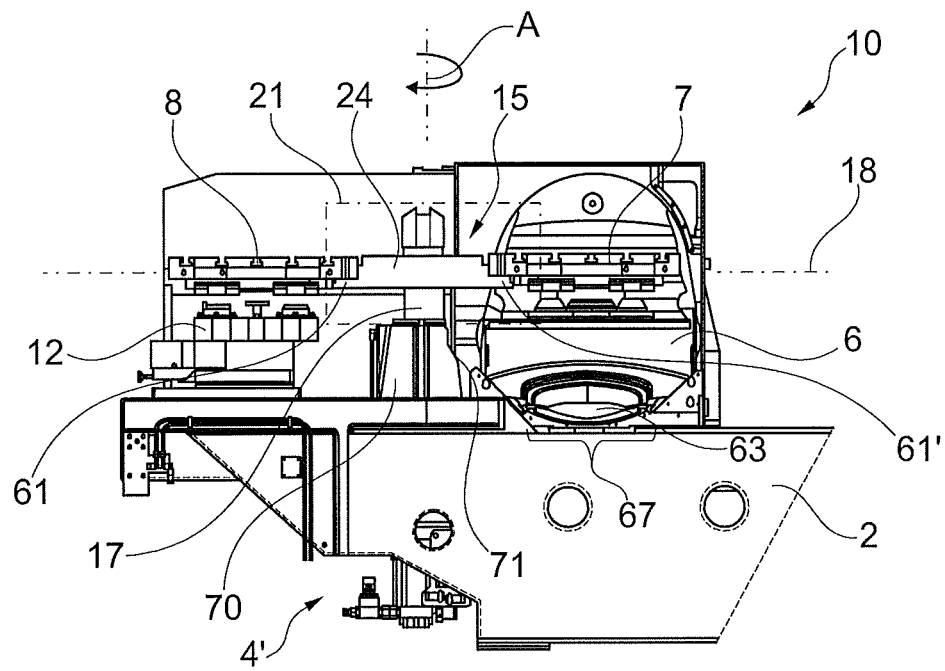
FIG. 6 is a schematic drawing of part of a machine tool, comprising a pallet changing device in a first stage of a pallet exchanging process.
Figure 7:
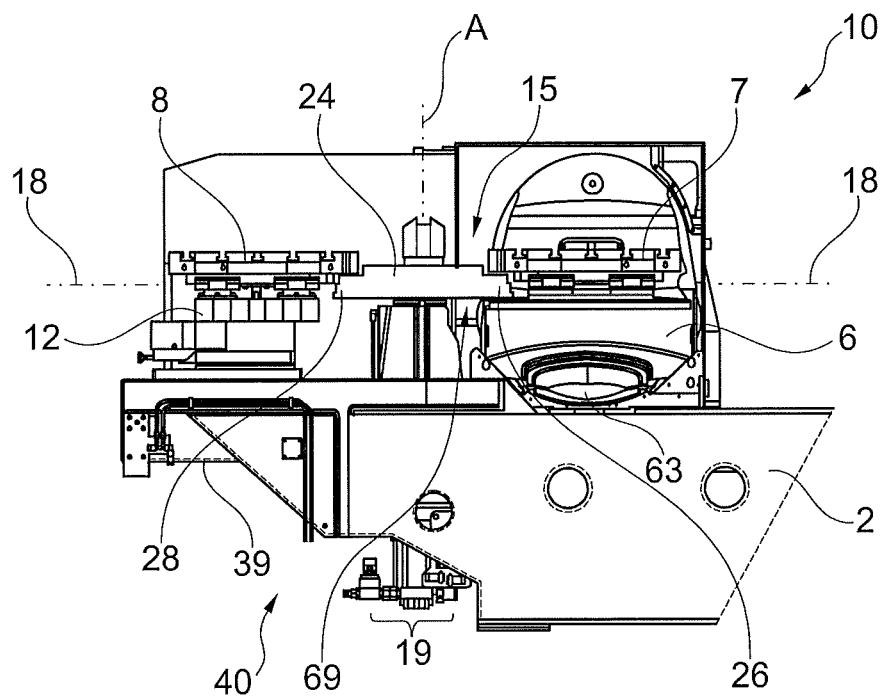
FIG. 7 is a schematic drawing of part of a machine tool, comprising a pallet changing device in a second stage of a pallet exchanging process.

FIG. 7 shows the changing means 15 in the changing position before the engagement in the first pallet 7 and in the second pallet 8 (in this stage the changing means 15 can be rotated below the first pallet 7 and into the second pallet 8), and FIG. 6 shows the changing means 15 in the changing position during the engagement in the first pallet 7 and in the second pallet 8. So as to achieve engagement in the first pallet 7 and in the second pallet 8, starting from the stage shown in FIG. 7, the lifting means 20 is controlled in such a way that the rotational column 17 moves upwards (FIG. 6). Subsequently, the rotational drive means 19 is actuated in such a way that the changing means 15 is rotated about the axis A (through 180°). Subsequently, the lifting means 20 is controlled in such a way that the rotational column 17 moves downwards, and as a result the pallets 7, 8 are placed back (the other way around) on the turntable 6 and the pallet carrier 12 (analogously to FIG. 7).

FIGS. 6 and 7 illustrate that the rotational drive motor 19 is positioned below the plane of the machine bed 2. It is carried by the pallet changer housing 39 that is connected to the front end of the machine table.

Figure 8:
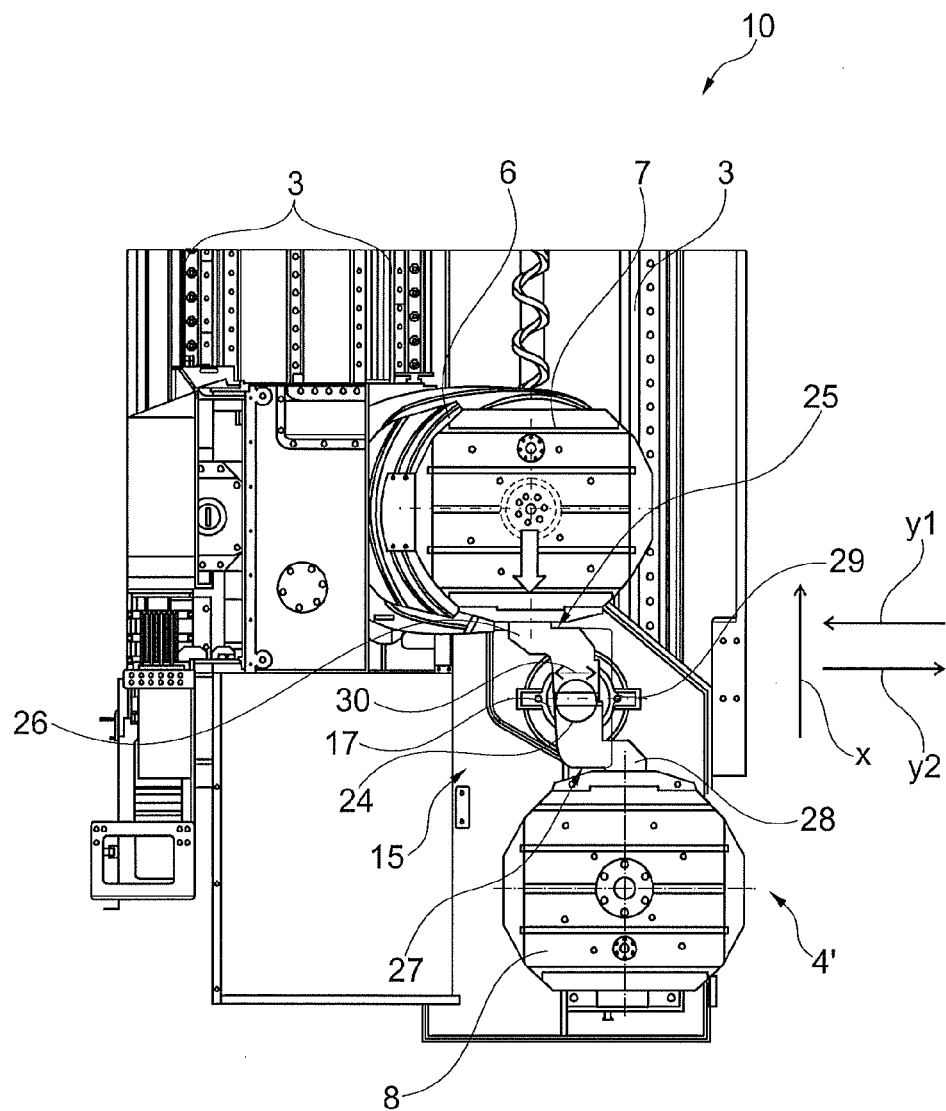
FIG. 8 is a schematic plan view of part of a machine tool in a first stage of a pallet exchanging process.
Figure 9:
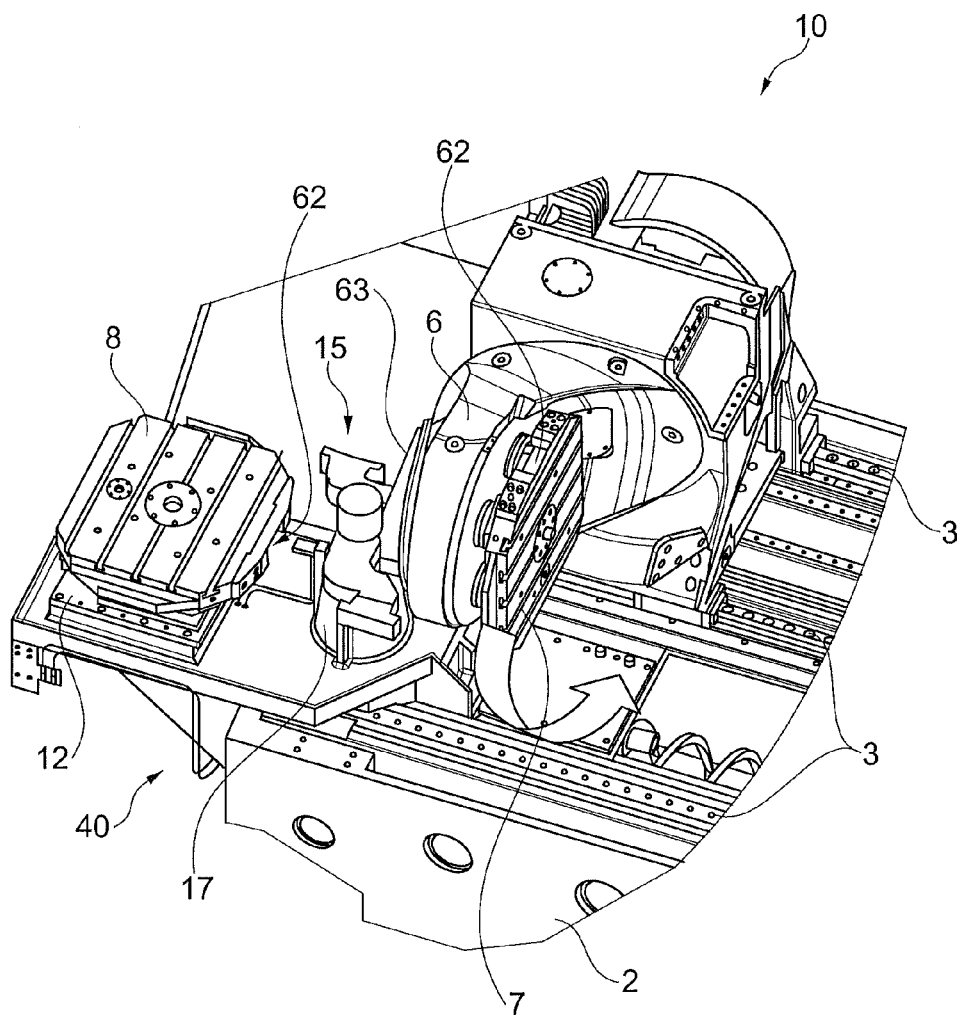
FIG. 9 is a schematic isometric view of a machine tool during pivoting of the pivoting circular table.

As is shown in FIGS. 8 and 9, in accordance with an embodiment of the present disclosure, the changing means 15 comprises a longitudinal element 24 that extends within the working plane 18 and that is rotatable within the working plane 18 by rotating the rotational column 17 about the longitudinal axis A thereof, a first connecting element (claw element 26) for gripping a first pallet 7 being arranged on a first end 25 of the longitudinal element 24 and extending away from the longitudinal element 24 in a first direction Y1 within the working plane 18, and a second connecting element (claw element 28) for gripping a second pallet 8 being arranged on a second end 27 of the longitudinal element 24 and extending away from the longitudinal element 24 in a second direction Y2 that is counter to the first direction Y1, within the working plane 18. The ratio of the length 29 of the longitudinal element 24 to the width 30 of the longitudinal element 24 is preferably in the range of 3.5 to 1.5. The shape of the changing means 15 resulting from this ratio additionally contributes to the possibility of rotating the circular table 6 freely even when it is located in the changing position with the pallet carrier 12 of the pallet changing device 40, as is described in the following.

So as to guarantee the maximum movability of the circular table 6, in this embodiment, the changing means 15 is movable back and forth between a changing position (gripping position) (see FIG. 8), in which the longitudinal element 24 takes on a first orientation (approximately parallel to the X direction), the first claw element 26 can engage in the first pallet 7 and the second claw element 28 can engage in the second pallet 8, and a home position (see FIG. 9), in which the longitudinal element 24 takes on a second position perpendicular to the first orientation (and approximately parallel to the Y direction), and the first claw element 26 and the second claw element 28 release respective palettes 7, 8. For this purpose, the changing means 15 is initially displaced downwards from the position 22 in FIG. 5 by means of the lifting means 20.

After reaching the lowest position 35 (see FIG. 5), the longitudinal element 24 is subsequently rotated through 90° into the home position. This is possible in particular because the rotational and lifting columns are mutually coupled, and the drive means, including the transmission, is arranged outside the workspace of the pallet changing device. In this case, maximum freedom of movement of the circular table 6 is ensured in the home position, as can be seen in FIG. 9. In FIG. 9, the circular table 6 is pivoted in an X-Z plane in the changing position, without colliding with the changing means 15. Thus, the changing means 15 can advantageously be displaced into the home position after each pallet exchanging process, and immediately afterwards, the machining of the workpiece on the pivoting circular table 6 can be started, without having to displace it horizontally for this purpose.

In the embodiments disclosed in FIGS. 6 to 9, the rotational drive means 19 and the lifting means 20 are located below the upper plane of the machine bed 2. Alternatively, the rotational drive means 19 and the lifting means 20 may also be arranged to the side of the machine bed 2. In addition, in the embodiments disclosed in FIGS. 6 to 9, the pallet changing device 40 is rigidly connected to the machine bed 2. Alternatively, however, the pallet changing device 40 could be arranged so as to be displaceable along guide rails on the machine bed.

Figure 10:
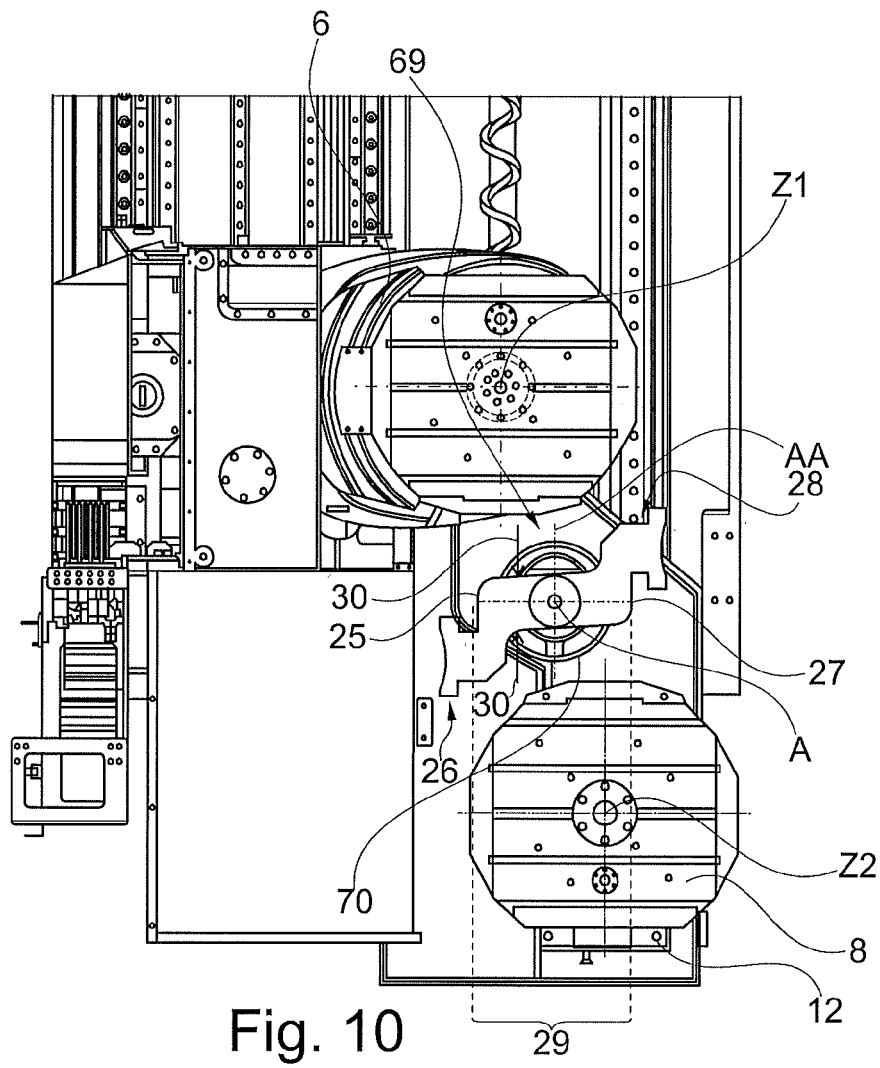
FIG. 10 is a schematic plan view of part of a machine tool in a first stage of a pallet exchanging process.
Figure 11:
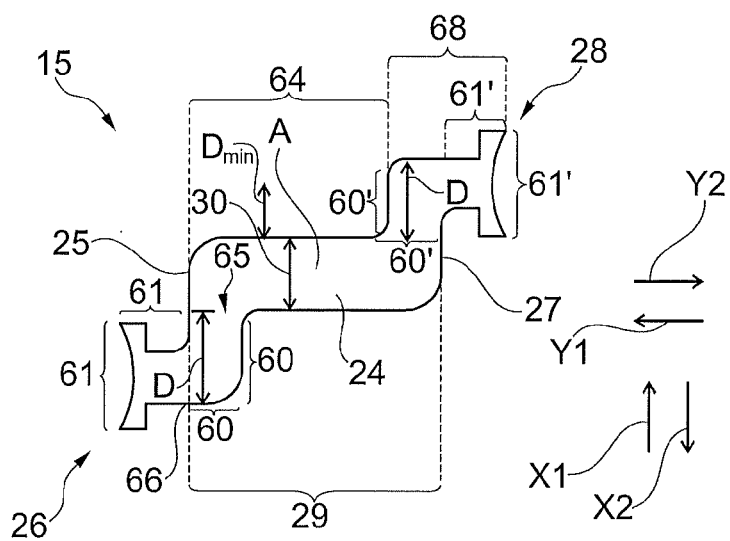
FIG. 11 is a schematic plan view of a changing means.

As can be seen in FIGS. 10 and 11, the first connecting element (claw element) 26 and the second connecting element (claw element) 28 may advantageously each comprise a first portion 60 that extends away from the corresponding end 25, 27 of the longitudinal element 24 along the first direction X1 or second direction X2, respectively, and each comprise a second portion 61 that is adjacent to the corresponding first portion 60 and extends away therefrom in a direction Y1, Y2 that extends (at least substantially) parallel to the longitudinal direction of the longitudinal element 24. In this context, the directions relate to the home position of the longitudinal element 24, by contrast with FIG. 8 (changing position). The second portion 61 of the first connecting element 26 may be formed so as to engage in the first pallet 7, and the second portion 61' of the second connecting element 28 may be formed so as to engage in the second pallet 8 (and vice versa). The advantage of a configuration of this type of the changing means 15 is described below in connection with the description of a machine tool 10.

For example, the pivoting circular table 6 and the pallet carrier 12 are positioned with respect to one another in the changing position in such a way that the centre Z1 of the first pallet 7 and the centre Z2 of the second pallet 8 are each positioned equidistant from an axis AA that intersects the axis of rotation A of the rotational column 17 and that extends parallel to a displacement direction X of the pivoting circular table 6. This makes it possible to provide the pallet carrier 12 in the edge region of the machine tool 10 in terms of the Y direction, maximising the available workspace for the pivoting circular table 6 and simplifying access to the pallet carrier 12 for a person.

In a case of this type, the above-described configuration of the changing means 15 is particularly advantageous, since in spite of respective offsetting of the first pallet 7 and the second pallet 8 with respect to the axis of rotation A of the rotational column 17, the second portions 61, 61' of the connecting elements 26, 28 each always engage in the first/second pallet 7, 8 parallel to the displacement direction X of the workpiece table 6. This is particularly expedient for reasons of statics, in particular if a corresponding engagement mechanism 62 (see FIG. 9) in the first/second pallet 7, 8, in which the second portions 61, 61' of the connecting elements 26, 28 engage, is arranged centrally on the edge of the pallet 7, 8 with respect to the centre Z1, Z2 of the pallet 7, 8.

The longitudinal element 24 can be configured in such a way that, when the pivoting circular table 6 pivots in the home position of the longitudinal element 24, a minimum distance Dmin between the lower face 63 of the pivoting turntable 6 and a region 64 of the longitudinal element 24 that is positioned between the first connecting element 26 and the second connecting element 28 is smaller than a distance D between a first end 65 and a second end 66 of the first portion 61 of the first connecting element 26 or is smaller than a corresponding distance for the second connecting element 28. In other words, the lower face 63 of the pivoting turntable 6 may end up lower in one region 67, which opposes a region 64 of the longitudinal element 24 between the first connecting element 26 and the second connecting element 28 when the pivoting turntable 6 pivots, than in other regions of the lower face 63 of the pivoting turntable 6, since there is more space available for pivoting in this region 64 than in the region 68 of the changing means 15, in which the first connecting element 26 or the second connecting element 28 protrudes from the longitudinal element 24 towards the pivoting turntable 6.

The profile of the changing means 15 may be configured in such a way that, during pivoting of the pivoting circular table 6, at least part of the lateral profile of the changing means 15 substantially corresponds to a profile of the lower face 63 of the pivoting turntable 6 when the longitudinal element 24 is in the home position and when the distance between the lower face 63 of the pivoting circular table 6 and the longitudinal element 24 in a region 64 of the longitudinal element 24 between the first connecting element 26 and the second connecting element 28 is at a minimum (that is to say corresponds to Dmin). In other words, the lower face 63 of the pivoting circular table 6 is adapted appropriately to the lateral profile of the changing means 15, in such a way that, during pivoting of the pivoting circular table 6, the space 69 between the pivoting circular table 6 and the changing means is optimally made use of (filled by the pivoting circular table 6).

The lifting means 20 may comprise a guide structure 70 that guides the rotational column 17 in a region directly below the changing means 15, the guide structure 70 being bevelled or comprising a recess 71 on a side facing the pivoting circular table 6, in such a way that the guide structure 70, starting from an end facing the changing means 15, widens downwards towards the pivoting circular table 6, the pivoting turntable 6 being able to move through the bevelled region or the recess 71 during pivoting. In this way, additional space for pivoting can be made available to the pivoting circular table 6, without significantly detracting from the quality of the guidance of the rotational column 17 by the guide structure 70, since no bevellings or recesses are provided on any of the other sides, and this is sufficient for a high-quality guidance 70.

If the pallet carrier 12 is likewise in the form of a pivotable turntable, the above applies analogously in this case too.

The invention is not confined to the presented exemplary embodiments but comprises further combinations of the structural details presented in this description so as to create further exemplary embodiments according to a required use based on the knowledge of a person skilled in the art.

The invention claimed is:

1. A pallet changing device for changing pallets for supporting workpieces on a machine tool, comprising:
   a changing arm comprising two ends, each of the ends comprising a respective connecting element for releasably connecting the pallet changing device to a respective one of the pallets;
   a rotatable column, to the outside of which a spur gear is attached at a lower portion of the column, and on which rotatable column the changing arm is supported for rotation about a longitudinal axis of the column;
   a rotational drive assembly for rotating the changing arm and the column about the longitudinal axis, wherein the rotational drive assembly includes a motor, and also includes a pinion that is operationally connected to the spur gear in such a way that when the pinion is rotated by the motor, the spur gear is rotated, and thus the rotatable column and changing arm are rotated about the longitudinal axis of the column; and a lifting device for raising and lowering the changing arm and the column and the spur gear, and a guide structure for guiding the raising and lowering of the column, which guide structure comprises a stop against which an upper face of the spur gear strikes to impede the upward progress of the column being raised by the lifting device.

2. The pallet changing device according to claim 1, wherein the motor is located below the changing arm and the lifting device is mounted below the column.

3. The pallet changing device in accordance with claim 1, wherein the lifting device is a lifting cylinder.

4. The pallet changing device according to claim 3, wherein the lifting cylinder comprises a pressurizing medium cylinder that is below the rotatable column.

5. The pallet changing device according to claim 1, further comprising a stop on which a lower face of the spur gear strikes to impede the downward progress of the column being lowered by the lifting device.

6. The pallet changing device according to claim 1, wherein the pinion is engaged with the spur gear throughout the raising and lowering of the rotatable column.

7. The pallet changing device according claim 1, wherein the length of the pinion is greater than a maximum distance of travel in a height direction of which the rotatable column is capable.

8. The pallet changing device according to claim 1, wherein the rotatable column comprises the lower portion and also comprises an upper portion, a diameter of the upper portion of the rotatable column being greater than a diameter of the lower portion of the rotatable column.

9. The pallet changing device according to claim 8, wherein the diameter of the upper portion of the rotatable column is made smaller than the diameter of the spur gear.

10. The pallet changing device according to claim 1, wherein the motor of the rotational drive assembly comprises a servo motor, a longitudinal axis of which is arranged parallel to the longitudinal axis of the rotatable column.

11. The pallet changing device according to claim 1, wherein the changing arm comprises a longitudinal element having a longitudinal axis that extends perpendicular to the longitudinal axis of the rotatable column, which longitudinal element is rotatable about the longitudinal axis of the rotatable column, wherein a first one of the connecting elements is arranged on a first end of the longitudinal element and is for gripping a first one of the pallets, and extends away from the longitudinal element in a first direction, and wherein a second one of the connecting elements is arranged on a second end of the longitudinal element and is for gripping a second one of the pallets, and extends away from the longitudinal element in a second direction that is counter to the first direction.

12. The pallet changing device according to claim 11, wherein the changing arm is movable back and forth between a changing position, in which the longitudinal element takes on a first orientation and in which the first connecting element can engage in the first pallet and the second connecting element can engage in the second pallet, and a home position, in which the longitudinal element takes on a second orientation rotated about a vertical axis with respect to the first orientation.

13. The pallet changing device according to claim 12, wherein the changing arm is set up so as to be lowered by the lifting device from the changing position, before or after the longitudinal element rotates from the changing position into the home position.

14. The pallet changing device according to claim 11, wherein the first connecting element and the second connecting element each comprise a respective first portion that extends away from the longitudinal element in the first direction or second direction, respectively, and each comprise a respective second portion that is adjacent to the corresponding first portion and extends away therefrom in a direction that extends at least substantially parallel to the longitudinal direction of the longitudinal element, the second portion of the first connecting element being formed so as to engage in the first pallet, and the second portion of the second connecting element being formed so as to engage in the second pallet.

15. A machine tool, comprising:
a workpiece table that carries a first of the pallets, and
a pallet changing device according to claim 1, wherein the pallet changing device further comprises a pallet carrier for receiving a second of the pallets.

16. The machine tool according to claim 15, in which the workpiece table is in the form of a pivoting circular table, wherein the pivoting circular table and the pallet carrier can be displaced with respect to one another into pallet changing position, in which the distance between the pivoting circular table and the pallet carrier is adjusted in such a way that the changing arm can engage in the first pallet and in the second pallet, and wherein the changing arm, the pivoting circular table, and the pallets are dimensioned and positioned in such a way that when one of the first and second pallets are affixed to the pivoting circular table, the pivoting circular table and the affixed pallet can be pivoted without striking the changing arm when the changing arm is located in a home position in which the changing arm has been rotated about the longitudinal axis of the rotatable column from a changing position in which the connecting elements can engage in respective pallets.

17. The machine tool according to claim 16, wherein a center of the first pallet, when the first pallet is held on the pivoting circular table, and a center of the second pallet when the second pallet is located on the pallet carrier, are each spaced equidistant from an axis that intersects the axis of rotation of the rotatable column and that extends parallel to a displacement direction of the workpiece table.

18. The machine tool according to claim 16, wherein the changing arm is configured in such a way that, when the pivoting circular table pivots when the changing arm is in the home position, a minimum distance (Dmin) between the lower face of the pivoting circular table and a region of the changing arm that is between the connecting elements is smaller than a distance between a first end and a second end of a first portion of one of the connecting elements.

19. The machine tool according to claim 18, wherein the profile of the changing arm is configured in such a way that, during pivoting of the pivoting circular table, at least part of a profile of the changing arm substantially corresponds to a profile of the lower face of the pivoting circular table when the changing arm is in the home position and when the distance between the lower face of the pivoting circular table and the changing arm in a region of the changing arm between the connecting elements is at a minimum.

20. The machine tool according to claim 16, wherein the guide structure guides the rotatable column in a region of the column directly below the changing arm, the guide structure being bevelled on or comprising a recess on a side of the guide structure proximal to the pivoting circular table in such a way that the guide structure, starting from an end of the guide structure proximal to the changing arm, widens downwards, the pivoting circular table being able to move through the bevelled region or the recess during pivoting of the pivoting circular table.

21. The machine tool according to claim 15, comprising a machine bed, wherein a guide rail for guiding a movement of the pivoting circular table is arranged on the machine bed.

* * * * *